Figure 5:
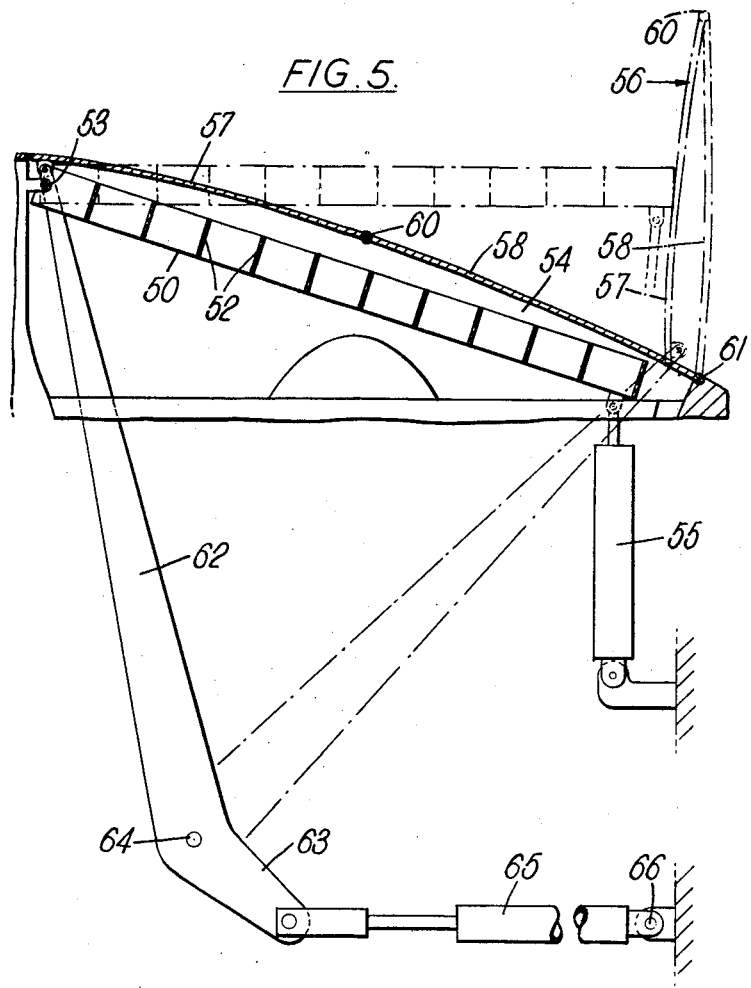

June 9, 1964  T. H. KERRY  3,136,500
HOUSINGS FOR JET PROPULSION GAS TURBINE ENGINES
Filed Oct. 2, 1961  3 Sheets-Sheet 1
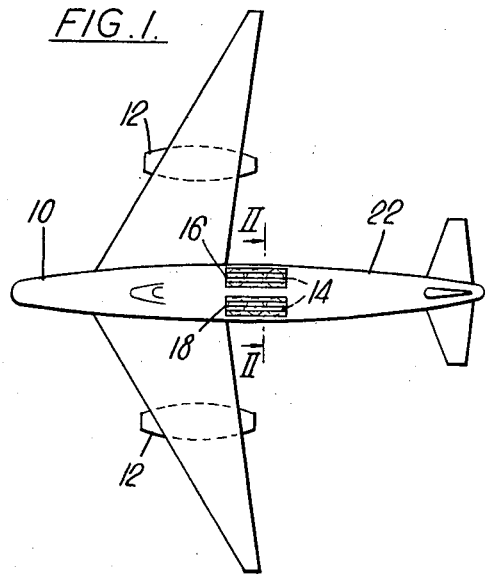
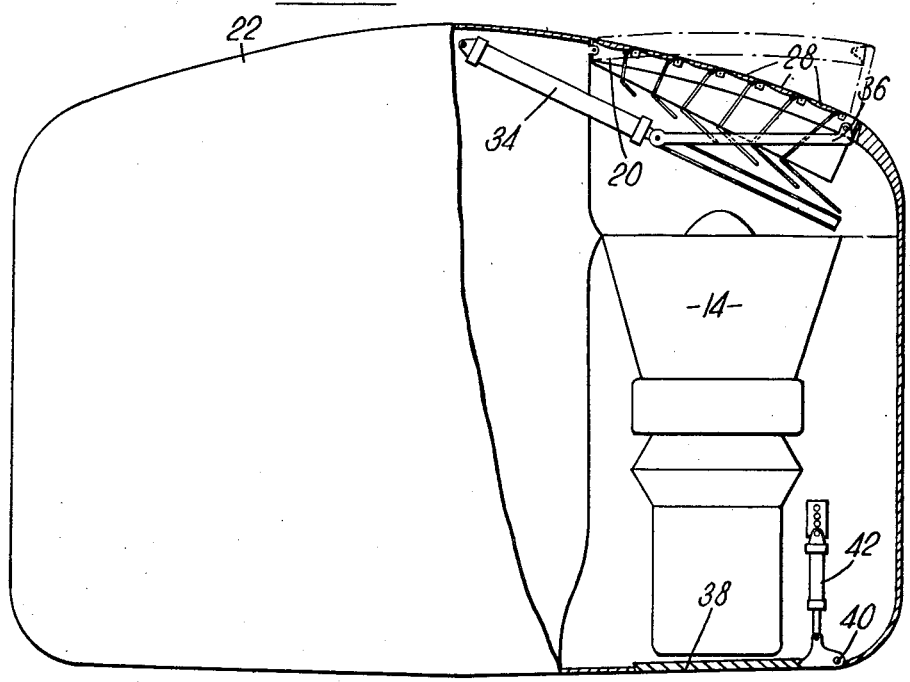
Inventor
Thomas Henry Kerry
By
Cushman, Darby & Cushman
Attorneys

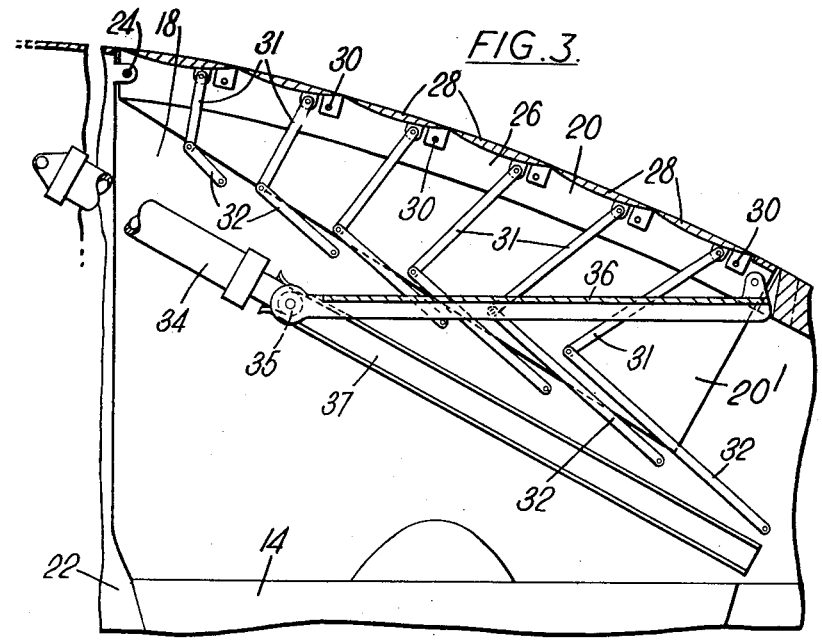
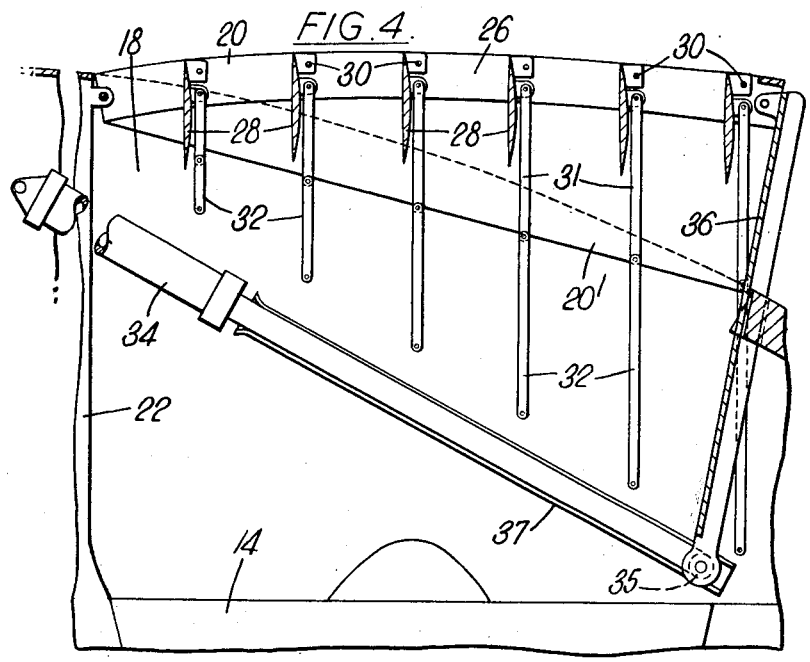

June 9, 1964 T. H. KERRY 3,136,500
HOUSINGS FOR JET PROPULSION GAS TURBINE ENGINES
Filed Oct. 2, 1961 3 Sheets-Sheet 3

Inventor
Thomas Henry Kerry
By
Cushman, Darby & Cushman
Attorneys

United States Patent Office 3,136,500
Patented June 9, 1964

1

3,136,500
HOUSINGS FOR JET PROPULSION GAS TURBINE ENGINES
Thomas Henry Kerry, Derby, England, assignor to Rolls-Royce Limited, Derby, England, a company of Great Britain
Filed Oct. 2, 1961, Ser. No. 142,156
Claims priority, application Great Britain Oct. 6, 1960
3 Claims. (Cl. 244—23)

This invention which relates to aircraft adapted for vertical take-off and landing, is an improvement in or modification of the invention set forth in the United States co-pending application Serial No. 142,157 of Goeffrey Light Wilde and Frederick Reginald Murray, filed October 2, 1961, now Patent No. 3,099,423.

Such aircraft may be provided, in addition to forward propulsion engines, with vertical lift engines (e.g., jet propulsion gas turbine engines) which are employed during take-off and landing.

The term "vertical lift engines" in this specification is to be understood to mean engines arranged to produce lift forces on the aircraft independently of the lift forces generated aerodynamically by forward flight of the aircraft.

The housing for the lift engines must be maintained as small as possible in relation to the length of the lift engines, but the height of the housing above the engine air intake must be such as to ensure that the air flowing into the engine air intake attains as near as possible laminar flow.

It is therefore the object of this invention to provide arrangements which will attain this object whilst still maintaining the height of the housing as small as possible.

According to one aspect of the present invention there is provided an aircraft adapted for vertical take-off and landing and having a housing within which is mounted at least one vertical lift engine, the housing being provided with a vertically movable air inlet member adapted for the passage therethrough of air drawn into the engine air intake or intakes, guide vanes mounted on the air inlet member and movable between a closed position in which they prevent admission of air into the housing and an open position in which they guide air into the engine air intake or intakes, means for moving the guide vanes between the closed and open positions, and means for moving the air inlet member vertically upwardly so as to increase the distance between the said air inlet member and the engine air intake or intakes when the said engine or engines is or are to be brought into operation.

Preferably the means for moving the guide vanes between the closed and open positions is brought into operation on vertical movement of the air inlet member. Thus each guide vane may be mounted on a pivot member which is connected by a linkage to the aircraft fuselage, vertical movement of the air inlet member causing the linkages to rotate the pivot members. Preferably the guide vanes, when in the closed poistion, merge substantially smoothly into and form part of the outer surface of the housing.

Preferably all the air passing into the engine air intake or intakes is forced to pass through the air inlet member.

According to another aspect of the present invention there is provided an aircraft adapted for vertical take-off and landing and having a housing within which is mounted at least one vertical lift engine, a closure member for closing an opening at the top of the housing, a vertically movable air inlet member adapted for the passage therethrough of air drawn into the engine air intake or intakes, means for moving the closure member between closed and open positions, and means, operable

2 independently of the last-mentioned means, for moving the said air inlet member vertically upwardly so as to increase the distance between the air inlet member and the engine air intake or intakes when the said engine or engines is or are to be brought into operation.

The invention is illustrated, merely by way of example, in the accompanying drawings, in which:

FIGURE 1 is a plan view of an aircraft having forward propulsion engines and vertical lift engines, FIGURE 2 is an enlarged part sectional view on line II—II in FIGURE 1, showing one construction of air inlet member for the lift engine housing, FIGURE 3 is an enlarged view of part of the structure shown in FIGURE 2, FIGURE 4 is a view similar to that shown in FIGURE 3 but in which the air inlet member is shown in a position in which air can be admitted into the housing, and FIGURE 5 is a view similar to that shown in FIGURE 3, but illustrating an alternative form of air inlet member and closure means.

Referring to FIGURES 1 to 4 of the drawings, 10 indicates an aircraft having forward propulsion gas turbine engines 12 and vertical lift producing gas turbine engines 14, that is gas turbine jet propulsion engines which are disposed so that they produce a propulsive thrust in a vertical direction whereby they produce lift forces on the aircraft independently of the lift forces generated aerodynamically by forward flight of the aircraft.

In this particular construction six lift engines 14 are employed and are carried in housing 16 and 18, the said housings being disposed on opposite sides of the longitudinal axis of the aircraft fuselage 22. Three lift engines 14 are mounted in each of the housings 16, 18.

Each of the housings 16 and 18 are provided with means for selectively admitting, and preventing the admission of air into the housing and for selectively covering and uncovering an outlet for the exhaust gases of the engines.

The means for admitting air into each of the housings 16 and 18 comprises a frame-like member 20 having downwardly projecting extensions 20' on each end, which is pivotally connected to the upper surface of the fuselage at 24 and extends over the whole width and length of the housing. The frame 20 defines an air inlet 26 in which is supported a series of guide vanes 28 extending along the length of the frame, the guide vanes 28 being supported on pivot members 30 about which they can be rotated from the position shown in FIGURE 3, in which they close the inlet 26, to the position shown in FIGURE 4, in which they open the inlet 26.

Each guide vane 28 is caused to swing about its pivot 30 when the frame 20 is swung about its pivot 24 by means of a linkage 31, 32 connected between each guide vane 28 and the fuselage 22 of the aircraft.

It will be seen therefore that when the frame 20 is moved from the position shown in FIGURE 3 of the drawings to that shown in FIGURE 4, the guide vanes will be moved through approximately 90 degrees from a position in which they merge substantially smoothly into and form part of the outer surface of the frame and also of the outer surface of the housing and of the fuselage to a position in which they are disposed substantially vertically.

The frame 20 is turned about its pivot 24 by a hydraulic jack 34 connected to one end of a member 36. The other end of the member 36 is connected to the end of the frame 20, remote from the pivot 24. The member 36 is provided with a roller 35 which engages in a track 37 in one wall of the housing. Accordingly, movement of the member 36 by the jack 34 causes vertical movement of the frame 20 with respect to the engine air intakes.

It will be seen that when the frame 20 is in the position shown in FIGURE 4 of the drawings air can only enter the housing through the frame 20.

The outlet for the exhaust gases from the lift engines is covered by a door 38 which is pivotally connected to the fuselage at 40, the door being connected to a hydraulic jack 42 whereby the door can be swung between a position in which it closes the outlet, and a further position in which it opens the outlet.

When the lift engines are to be brought into operation the hydraulic jacks 34 and 42 are actuated so that the frame 20 and guide vanes 28 are moved to the position shown in FIGURE 4 of the drawings and the door 38 moved to open the exhaust gas outlet.

Air entering the housing through the air inlet in the frame 20 will have substantially laminar flow because of the straightening effect of the guide vanes 28. It will also be appreciated that because the frame has moved vertically relative to the housing when opening the air inlet that the distance between the frame and the air intakes of the engines has been increased and that therefore the distance travelled by the air after passing through the frame is greater than would be the distance if the frame had not been moved vertically.

Therefore any swirl which remains in the air after it has passed through the guide vanes will be obviated or reduced by the increased travel of the air.

In the alternative arrangement shown in FIGURE 5 of the drawings the air inlet is defined by a frame member 50, supporting fixed guide vanes 52 which extend parallel to the longitudinal axis of the aircraft, one end of the said frame member 50 being pivoted to the fuselage at 53. A ram 55 is pivotally connected both to the fuselage and to the end of the frame member 50 remote from the pivot 53. Thus the frame member 50 may be moved vertically upwardly and downwardly with respect to the engine air intakes by the ram 55.

The frame member 50 is disposed within the housing when the lift engines are not in use, and an opening 54 is provided in the housing to permit the frame member 50 to be moved from its full line position in the housing to the dotted line position out of the housing.

When the frame member 50 is disposed within the housing, the opening 54 is closed by a closure member 56 of the kind described and claimed in the co-pending United States application Serial No. 48,970 of Maurice Ian Taylor, filed August 11, 1960, and now United States Patent No. 3,037,723, issued June 5, 1962. The forementioned United States Patent No. 3,037,723 is assigned to the same assignee, Rolls-Royce Limited, Derby, England, as this application. The closure member 56 comprises two parts 57, 58 which are arcuate in cross section and which are connected together by a pivot member 60. The part 58 is pivoted to the fuselage at 61 while the part 57 is pivotally connected to an arm 62 of a bell crank lever 62, 63 which is pivotally connected to the fuselage at 64.

The arm 63 of the bell crank lever is pivotally connected to a ram 65 which is itself pivoted to the fuselage at 66. The ram 65, which is operable independently of the ram 55, is thus adapted to move the closure member 56 between the closed and open positions which are respectively indicated by full lines and dotted lines.

When the lift engines 14 are to be brought into operation the closure member 56 is moved to uncover the opening 54 and then the frame member 50 is moved to the dotted line position where its free longitudinal edge engages with the closure member 56.

Thus air entering the housing must pass over the guide vanes 52, and as in the previous construction the distance through which the air must travel after passing through the guide vanes is greater than if the air inlet to the housing was in the closure member, whereby any swirl in the air can be obviated or reduced.

It will be seen therefore that the present invention enables a lift engine housing to be maintained as small as possible in relation to the length of the engine whilst ensuring that when the engine is in operation air entering the engine air intake does not have undue swirl characteristics.

We claim:

1. In an aircraft adapted for vertical take-off and landing and having a longitudinal axis and a vertical median plane containing said longitudinal axis, aircraft structure having an upper surface which is inclined downwardly away from said vertical median plane, a lift engine housing formed in said structure and having an opening in said surface, at least one vertical lift engine mounted within said housing, said engine having an engine air intake, an upwardly movable air intake gride for reducing swirl in air entering said engine air intake, said grid comprising a plurality of guide vanes which are immovably mounted relatively to one another, a pivot extending parallel to said longitudinal axis and pivotally connecting said grid to the top of said housing on the side of said opening nearest said vertical median plane, and actuating means connected to said grid for moving the grid upwardly from a downwardly inclined inoperative position within said opening to a horizontal operative position outwardly of the housing at an increased distance from said engine air intake.

2. An aircraft as claimed in claim 1 in which said guide vanes are parallel to said longitudinal axis.

3. In an aircraft adapted for vertical take-off and landing and having a longitudinal axis and a vertical median plane containing said longitudinal axis, aircraft structure having an upper surface which is inclined downwardly away from said vertical median plane, a lift engine housing formed in said structure and having an opening in said surface, a closure member for covering and uncovering said opening, said closure member comprising two panels, a hinge connecting said panels together, a pivotal connection connecting one of said panels to the side of said opening furthest from said vertical median plane, said hinge and said pivotal connection extending parallel to said longitudinal axis, and drive means connected to the other of said panels for bringing both panels folded about said hinge to substantially vertical positions in which they uncover said opening, at least one vertical lift engine mounted within said housing, said engine having an engine air intake, an upwardly movable air intake grid for reducing swirl in air entering said engine air intake, said grid comprising a plurality of guide vanes which are immovably mounted relatively to one another, a pivot extending parallel to said longitudinal axis and pivotally connecting said grid to the top of said housing on the side of said opening nearest said vertical median plane, and actuating means connected to said grid, said actuating means being operable when the panels of said closure member are substantially vertical to move the grid upwardly from a downwardly inclined inoperative position within said opening to a horizontal operative position outwardly of the housing at an increased distance from said engine air intake, and laterally engaging said other panel connected to said drive means.

References Cited in the file of this patent

UNITED STATES PATENTS

| | | |
|---|---|---|
| 2,936,969 | Griffith et al. | May 17, 1960 |
| 3,002,709 | Cochran | Oct. 3, 1961 |
| 3,037,723 | Taylor | June 5, 1962 |